United States Patent
Liu (10) Patent No.: US 10,198,071 B2
(45) Date of Patent: Feb. 5, 2019

(54) METHODS AND APPARATUSES FOR DETERMINING CONTROL INFORMATION

(71) Applicant: BEIJING ZHIGU RUI TUO TECH CO., LTD., Beijing (CN)

(72) Inventor: Hao Liu, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 15/545,112

(22) PCT Filed: Jan. 7, 2016

(86) PCT No.: PCT/CN2016/070393
§ 371 (c)(1),
(2) Date: Jul. 20, 2017

(87) PCT Pub. No.: WO2016/115983
PCT Pub. Date: Jul. 28, 2016

(65) Prior Publication Data
US 2017/0371412 A1    Dec. 28, 2017

(30) Foreign Application Priority Data
Jan. 23, 2015  (CN) .......................... 2015 1 0035431

(51) Int. Cl.
*G06F 3/01*    (2006.01)
(52) U.S. Cl.
CPC .............. *G06F 3/015* (2013.01); *G06F 3/012* (2013.01)
(58) Field of Classification Search
CPC ................ G06F 2203/011; G06F 3/011–3/015
USPC .................................................. 345/156–184
See application file for complete search history.

(56) References Cited

U.S. PATENT DOCUMENTS

| 5,967,996 A  | * | 10/1999 | Kadota ............. A61B 5/04842 600/544 |
| 7,123,955 B1 |   | 10/2006 | Xiaorong et al. |
| 2008/0211768 A1 | * | 9/2008 | Breen ..................... G06F 3/012 345/157 |
| 2010/0130882 A1 | * | 5/2010 | Nakada ............. A61B 5/04842 600/544 |

(Continued)

FOREIGN PATENT DOCUMENTS

| CN | 1248426 A   | 3/2000 |
| CN | 103150007 A | 6/2013 |

(Continued)

OTHER PUBLICATIONS

International Search Report and Written Opinion for Application No. PCT/CN2016/070393, dated Mar. 24, 2016, 10 pages.

*Primary Examiner* — Stephen G Sherman
(74) *Attorney, Agent, or Firm* — Sheppard Mullin Richter & Hampton LLP (57) ABSTRACT

The application discloses various methods and apparatuses for determining control information. One of the methods for determining control information disclosed comprises: acquiring EEG detection information of a human body in response to a motion of a head of the human body; and determining control information corresponding to the EEG detection information. Embodiments of the application may facilitate achieving a more natural, flexible and convenient human-computer interaction by taking the motion of the head as a locus of control.

21 Claims, 4 Drawing Sheets

Acquire EEG detection information of the human body in response to a motion of the head of the human body — S101

Determine control information corresponding to the EEG detection information — S102

(56) References Cited

U.S. PATENT DOCUMENTS

2011/0074668 A1* 3/2011 Mandanapu ............ G06F 3/015
                                                    345/156
2014/0052401 A1* 2/2014 Riley ...................... G01P 21/00
                                                    702/89
2014/0333529 A1    11/2014 Kim et al.

FOREIGN PATENT DOCUMENTS

| CN | 103246344 A | 8/2013 |
| CN | 103617362 A | 3/2014 |
| CN | 104095648 A | 10/2014 |
| CN | 104267808 A | 1/2015 |
| CN | 104503592 A | 4/2015 |
| CN | 104503593 A | 4/2015 |

* cited by examiner

METHODS AND APPARATUSES FOR DETERMINING CONTROL INFORMATION

CROSS-REFERENCE TO RELATED APPLICATIONS

The present application is a National Phase Application of International Application No. PCT/CN2016/070393, filed on Jan. 7, 2016, which claims priority to and benefit of Chinese Patent Application No. 201510035431.6, filed on Jan. 23, 2015, and entitled "Methods and Apparatuses for Determining Control Information". Both of the above-referenced applications are incorporated into the present application by reference herein in their entirety.

TECHNICAL FIELD

The application generally relates to the field of EEG technology, and in particular, to various methods and apparatuses for determining control information.

BACKGROUND

At present, rapid development of new technologies such as wearable computing technology, mobile computing technology, pervasive computing technology or the like poses a new challenge and a higher requirement on a human-computer interaction technology, while providing many new opportunities. At this stage, there has been some development regarding natural and harmonious human-computer interaction modes, the main characteristic thereof being a single-channel or multiple-channel interaction by an input method based on a gesture, an expression, voice, a handwritten form or the like, and the purpose thereof is to conduct human-computer interaction operation by motion, voice, expression and in other natural manners, which is the "user freedom" as emphasized in ideal human-computer interaction.

SUMMARY

A brief introduction to the application is made hereinafter so as to provide a basic understanding of certain aspects of the application. It is to be understood that the introduction is not an exhaustive introduction of the application. It is neither intended to define a key or important part of the application nor intended to limit the scope of the application. The purpose thereof is merely to provide some concepts, in a simplified form, as a preamble for more detailed description hereinafter.

Embodiments of the present application provide various methods and apparatuses for determining control information.

According to one aspect, an embodiment of the application provides a method for determining control information, comprising:

acquiring EEG detection information of a human body in response to a motion of a head of the human body; and determining control information corresponding to the EEG detection information.

According to another aspect, an embodiment of the application further provides an apparatus for determining control information, comprising:

an EEG detection information acquiring module, configured to acquire EEG detection information of a human body in response to a motion of a head of the human body; and a control information determining module, configured to determine control information corresponding to the EEG detection information.

The technical solutions according to the embodiments of the application may acquire EEG detection information of a human body in response to a motion of a head of the human body, and determine control information by using the EEG detection information. That is, adoption of the solutions is equivalent to indirectly establishing, by means of detection of EEG information, an association between a motion of the head and control information, thereby facilitating implementing, by taking a motion of the head as a locus of control, a more natural, flexible and convenient human-computer interaction, thus satisfying a user's diversified demands for practical application, and improving user experience.

These and other advantages of the application will be more apparent by means of a detailed description of optional embodiments of the application with reference to the accompanying drawings.

BRIEF DESCRIPTION OF THE DRAWINGS

It is possible to better understand the application from the following description with reference to the accompanying drawings, wherein the same or similar drawing reference used in all the accompanying drawings indicates the same or similar part. The accompanying drawings together with the following detailed description are comprised in the specification and form a part of the specification, and are used for further illustrating optional embodiments of the application and explaining the principles and advantages of the application. In the accompanying drawings.

Persons skilled in the art should understand that components in the accompanying drawings are shown merely for simplicity clearness, and may not be always drawn to scale. For example, sizes of some components may be amplified relative to other components, so as to facilitate understanding of the embodiments of the application.

DETAILED DESCRIPTION

A detailed description of exemplary embodiments of the application will be made with reference to the accompanying drawings hereinafter. For the sake of clearness and conciseness, not all characteristics of practical implementation manners are described in the specification. However, it is to be understood that in the process of developing any one of the practical embodiments, many decisions specific to the implementation manners shall be made, so as to achieve a specific objective of a developer, for example, conforming to limiting conditions related to a system and a service, and these limiting conditions may be changed with different implementation manners. In addition, it is to be understood that development work, which may be extremely complex and time-consuming, persons skilled in the art will likely benefit from the content of the present disclosure.

Hereon, it is to be explained that in order to avoid obscuring the application due to unnecessary details, in the accompanying drawings and the specification merely device structures and/or processing steps closely related to the solution according to the application are described, and representation and description of some parts or processing steps that are known to persons of ordinary skill in the art and little related to the application are omitted.

Further detailed description of specific implementation manners of the application will be made with reference to the accompanying drawings (the same reference number in some accompanying drawings indicates the same element) and embodiments. The following embodiments are intended to describe the application but are not intended to limit the scope of the application.

Persons skilled in the art may understand that terms such as "first", "second" or the like in the application are merely configured to distinguish among different steps, devices or modules and the like, neither representing any specific technical meaning nor indicating a necessary logic sequence.

Figure 1:
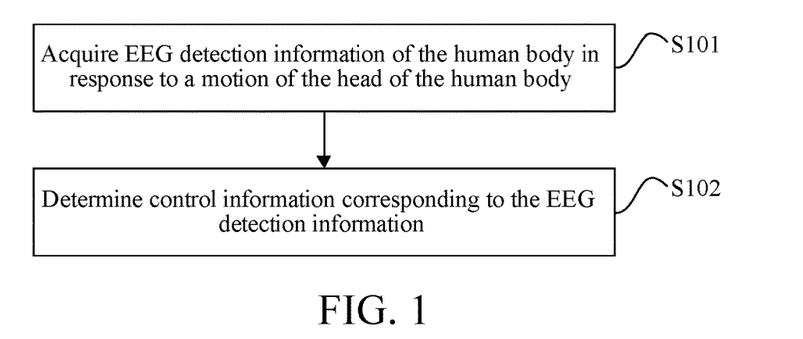
FIG. 1 is a flowchart of a method for determining control information according to an embodiment of the application.

FIG. 1 is a flowchart of a method for determining control information according to an embodiment of the application. A main body for executing the method for determining control information provided by the application is a certain apparatus for determining control information. A device representation form of the apparatus for determining control information is quite flexible, for example, the apparatus for determining control information may be a certain independent unit, or the apparatus for determining control information may also be integrated, as a certain functional module, into a certain electronic device, wherein the electronic device may comprise but is not limited to a wearable device, etc. Specifically speaking, as shown in FIG. 1, a method for determining control information according to an embodiment of the application comprises:

Step S101: Acquire EEG Detection Information of the Human Body in Response to a Motion of the Head of the Human Body.

The motion of the head comprises but is not limited to: nodding, leaning the head to one side, raising the head, shaking the head and/or rotating the head. The motion of the head may be spontaneously conducted by the human body subconsciously, or be conducted by the human body independently in certain ways, which may comprise but is not limited to duration of time, or number of repetition of a combination of a certain motion or some motions.

A study made by the inventor of the application indicates that a motion of the head, such as nodding, shaking the head or leaning the head to one side, may cause a physical change inside the head of the human body, and an impedance between the head skin of the human body in contact with an electroencephalogram (ElectroEncephaloGram, abbreviated as EEG) sensing element may also change correspondingly. These changes reflect that detected EEG information may reflect specific characteristics different from those when the head of the human body is in a motionless state (when the head of the human body does not execute the foregoing motions of the head).

S102: Determine Control Information Corresponding to the EEG Detection Information.

An EEG signal triggered by a motion of the head of the human body has a higher amplitude value and a distinct waveform characteristic, etc. Therefore, it is convenient for detection and analysis by taking EEG detection information of the motion of the head as a basis for determining control information. The EEG detection information indirectly reflects what a motion of the head of the human body is. Control information corresponding to the EEG detection information may be determined according to a corresponding relation between EEG information and the control information. For example, control information corresponding to an EEG detection signal when the human body is nodding is a "determining" instruction, control information corresponding to an EEG detection signal when the human body is shaking the head is a "canceling" instruction, control information corresponding to an EEG detection signal when the human body is turning the head to the left is a "zooming out" instruction, and control information corresponding to an EEG detection signal when the human body is turning the head to the right is an "amplifying" instruction, etc.

It is thus clear that the technical solution according to an embodiment of the application may acquire EEG detection information of the human body in response to a motion of the head of the human body, and determine control information by using the EEG detection information. That is, adoption of the solution is equivalent to indirectly establishing, by means of detection of EEG information, an association between a motion of a head and control information, thereby facilitating implementing, by taking a motion of the head as a locus of control, a more natural, flexible and convenient human-computer interaction, satisfying a user's diversified demands for practical application, and improving the user experience.

In the technical solution according to this embodiment of the application, an implementation manner for determining control information corresponding to the EEG detection information may be determined according to the actual need, which is quite flexible.

In an optional implementation manner, a mapping relation (might referred to as a first mapping relation) between EEG information and a control may be acquired in advance, and control information corresponding to the EEG detection information may be determined according to the first mapping relation. EEG information in the first mapping relation is the EEG information detected when the human body is conducting a certain motion of the head. The EEG information in the first mapping relation is a whole of normal EEG information, of the head of the human body, unrelated to whether or not conducting the foregoing motion of the head, and an "interference or noise" signal brought, by conducting the foregoing motion of the head, into normal EEG information of the human body. By using this solution, control information corresponding to EEG detection information may be determined according to the whole EEG detection information corresponding to a motion of the head.

The first mapping relation may be acquired in advance and an acquisition manner is quite flexible. For example, the apparatus for determining control information may acquire the first mapping relation from an external device (for example, a server, a Cloud, an intelligent terminal or the like). Or for another example, the apparatus for determining control information may establish the first mapping relation by itself. For example, the apparatus for determining control information may obtain EEG information corresponding to different motions of the head according to training data of the motions of the head, and use the EEG information as a sample to establish an association between the EEG information serving as the sample and a control instruction. In practical application, it is possible to make a comparison between EEG detection information in response to a motion of the head and EEG information serving as a sample, so as to determine, in a sample database, a control instruction corresponding to EEG information having the maximum matching degree with the EEG detection information, as a control instruction corresponding to the EEG detection information. EEG information of different human bodies may have differences. In practical application, learning and training may be conducted respectively on different human bodies. A sample database of EEG information of head motions of different human bodies is acquired, and association between the sample database of EEG information and user information corresponding to the human bodies is established, so as to apply different matching data sources to different human bodies, thereby improving accuracy in determining control information.

In another optional implementation manner, EEG characteristic information, of the EEG detection information, relative to EEG reference information of the human body may be determined; and control information corresponding to the EEG characteristic information may be determined. An EEG detection signal acquired in response to a motion of the head of the human body is manifested as a detected EEG, not only comprising normal EEG information of the human body, unrelated to whether or not conducting the foregoing motion of the head of the human body, but also comprising a whole "interference or noise" signal brought, by conducting the foregoing motion of the head, into normal EEG information of the human body. In this solution, the whole EEG detection information is not used as a basis for determining control information, instead a part of information of "interference or noise", relative to normal EEG information of the human body, in the whole EEG detection information is used as EEG characteristic information associated with the motion of the head, and the EEG characteristic information is used as a basis for determining the control information, thereby reducing amount of data needing to be processed, reducing complexity in data processing, and improving efficiency and accuracy in determining the control information.

Optionally, normal EEG information of the human body unrelated with whether or not conducting the foregoing motion of the head may be used as the EEG reference information. In order to facilitate extracting EEG characteristic information corresponding to the motion of the head, EEG information acquired from the same human body when the head of the human body is in a motionless state may be used as the EEG reference information. In practical application, it is possible to make a comparison between the EEG reference information and EEG detection information acquired in response to a motion of the head of the human body; a part, of the EEG detection information, different from the EEG reference information may be used as EEG characteristic information, and the EEG characteristic information is equivalent to information of "interference or noise" brought in by a certain motion of the head of the human body, which may better reflect the motion of the head of the human body. It is possible to further improve efficiency and accuracy in determining control information by determining the control information corresponding to the EEG characteristic information based on the EEG characteristic information, to cause that the actually determined control information is more consistent with an actual control demand for a motion of the head reflected by the EEG characteristic information of the human body.

Figure 2A:
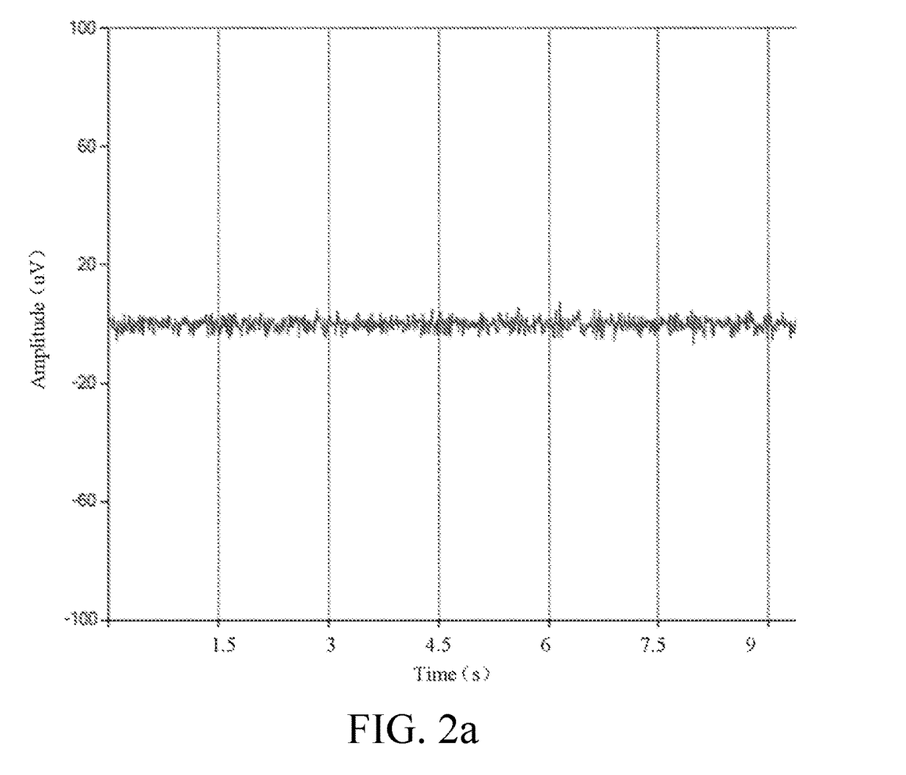
FIG. 2a is an EEG waveform of the human body detected when the head of the human body is in a motionless state according to an optional embodiment of the application.
Figure 2B:
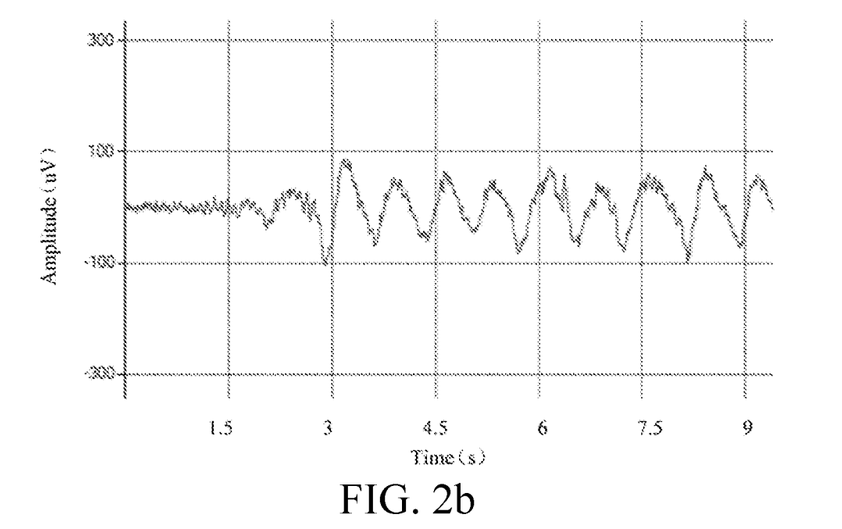
FIG. 2b is an EEG waveform of the human body detected when the head of the human body is nodding according to an optional embodiment of the application.
Figure 2C:
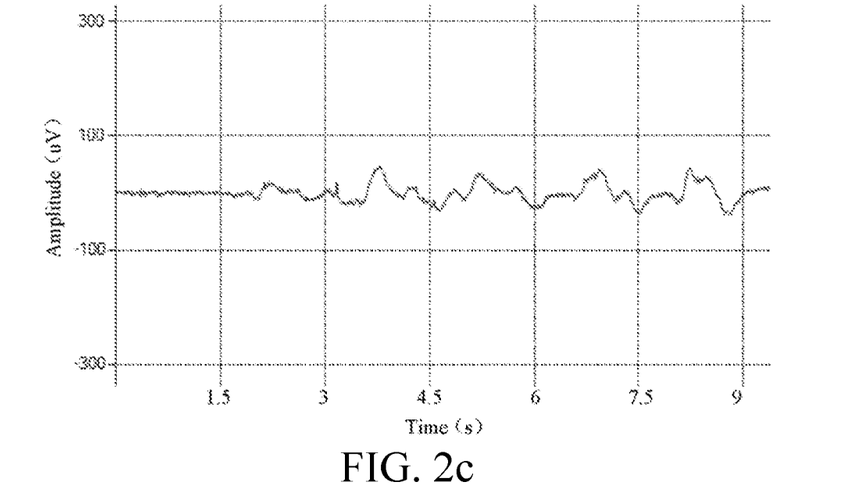
FIG. 2c is an EEG waveform of the human body detected when the human body is shaking the head according to an optional embodiment of the application.

Optionally, a manner for determining the EEG characteristic information is quite flexible, for example, the determining the EEG characteristic information comprises: extracting information in a certain frequency band from the EEG detection information as EEG sampling information; and determining control information corresponding to the EEG characteristic information according to an amplitude value of the EEG sampling information and a reference amplitude value of the EEG reference information in the frequency band. A frequency range of EEG information of the human body generally is from 0 to 32 Hz. In the process of practicing some embodiments of the application, the inventor of the application discovers that compared with EEG reference information acquired when the head of the human body is in a motionless state, EEG detection information when the human body is conducting a motion of the head generally changes greatly in an amplitude value within a certain frequency band in the foregoing frequency range, and the amplitude value of the EEG detection information in the frequency band is several times or even dozens of times higher than that of the EEG reference information. For example, a reference amplitude value of the EEG reference information generally is 0-10 uV when the head of the human body is in a motionless state, as shown in FIG. 2a, there is little difference between an amplitude value of EEG detection information in some frequency bands when the human body is conducting a certain motion of the head and that of the EEG reference information. However, the maximum amplitude value in some frequency bands may reach nearly one hundred microvolts, which is equivalent to dozens of times of the reference amplitude value of the EEG reference information in a corresponding frequency band. Referring to FIGS. 2b-2c for optional embodiments, wherein FIG. 2b is a detected EEG waveform of the human body when the human body is nodding according to an optional embodiment of the application, and FIG. 2c is a detected EEG waveform of the human body when the human body is shaking the head according to an optional embodiment of the application. For this purpose, a frequency band whose amplitude value changes greatly is extracted as EEG sampling information, and the EEG characteristic information is determined on a basis of reference amplitude values of the EEG sampling information and of the EEG reference information in corresponding frequency bands.

In the process of practicing an embodiment of the application, the inventor further discovers that in a frequency band 0-5 Hz of the frequency range of EEG information of the human body, a difference between an EEG wave acquired when the head of the human body is conducting a certain motion and an EEG wave acquired when the head of the human body is in a motionless state is the maximum. As shown in FIGS. 2b-2c, EEG characteristic information having a larger amplitude value may be acquired by extracting an EEG sampling signal in the frequency band of 0-5 Hz, so as to facilitate detection analysis and reduce error. An optional application example may be as below: it is possible to acquire a difference value between an amplitude value of EEG sampling information in the predetermined frequency band (for example, 0-5 Hz) and a reference amplitude value of the EEG reference information in a corresponding frequency band (0-5 Hz), and the difference value is taken as EEG characteristic information corresponding to the motion of the head. Using this solution to determine EEG characteristic information may facilitate detection and has lower complexity in data processing.

In the technical solution according to this embodiment of the application, an implementation manner for determining control information corresponding to the EEG characteristic information may be determined according to the actual need, which is quite flexible. For example, control information corresponding to the EEG characteristic information may be determined according to a mapping relation (might referred to as a second mapping relation) between the EEG characteristic information and the control information. The second mapping relation may be acquired in advance and an acquisition manner is quite flexible. For example, the apparatus for determining control information may acquire the second mapping relation from an external device (for example, a server, a Cloud, an intelligent terminal or the like). Or for another example, the apparatus for determining control information may establish the second mapping relation by itself. In this solution, control information may be determined according to a part of information (i.e., EEG characteristic information), corresponding to the motion of the head, in the EEG detection information.

Specifically speaking, EEG information acquired when the head of the human body is in a motionless state is detected as the EEG reference information, a clustering detection of EEG information is respectively conducted when the human body is conducting different motions of the head, and a comparison is made between the detected EEG information and the EEG reference information to determine a frequency band (for example, a frequency band of 0-5 Hz) in which an amplitude value difference therebetween is larger and determine an average amplitude value of an EEG reference signal in the frequency band of 0-5 Hz. Afterward, a difference value between the amplitude value of EEG information in the frequency band of 0-5 Hz corresponding to each type of motion of the head in the test and the average amplitude value of EEG reference information in the frequency band of 0-5 Hz is obtained, and the difference value serves as sample data indicating EEG characteristic information of a certain motion of the head. And a second mapping relation between the EEG characteristic information based on the sample data and control information is established. In this solution, based on learning and training data acquired from the clustering detection of EEG information of motions of the head of the human body, sample data of EEG characteristic information of the human body may be acquired, and an association between the EEG characteristic information serving as the sample data and user information of the human body is established, so as to apply different matching data sources to different human bodies. This solution is convenient for detecting EEG information, lower in complexity in data processing, higher in recognition accuracy and robust, etc.

Further optionally, before the extracting information in a certain frequency band from the EEG detection information as EEG sampling information, the method for determining control information further comprises: determining that the amplitude value of the EEG detection information in the frequency band is greater than a predefined threshold. The predefined threshold may be determined according to a characteristic of EEG information caused by a motion of the head. This solution may reduce interference to a certain extent by using the predefined threshold of the amplitude value of the EEG detection information in a certain frequency band (for example, 0-5 Hz) as a screening condition.

In addition, any method for determining control information according to an embodiment of the application may further comprise: executing an operation corresponding to the determined control information. For example, it is possible to control a certain electronic device to execute an operation such as input or selection of a certain program by determining control information corresponding to EEG detection information acquired in response to "nodding" as a "determining" instruction. For another example, it is possible to control a certain electronic device to execute an operation such as cancellation or deletion of a certain program by determining control information corresponding to EEG detection information acquired in response to "shaking the head" as a "canceling" instruction. For still another example, it is possible to control a certain player device to execute an operation such as increasing the volume by determining control information corresponding to EEG detection information acquired in response to "leaning the head to the left side" as a "volume increasing" instruction. Based on this solution it is possible to implement a natural, flexible and convenient human-computer interaction based on a motion of the head of the human body, satisfy a user's diversified demands for practical application, and improve the user experience.

Optionally, any method for determining control information according to an embodiment of the application may further comprise: determining a motion of the head corresponding to the EEG detection information. For example, it is possible to determine a motion of the head corresponding to EEG information or EEG characteristic information, a matching degree between which and EEG detection information satisfies a predetermined requirement, as a motion of the head corresponding to the EEG detection information by making a comparison between the EEG detection information acquired in response to the motion of the head and sample data of the EEG information or EEG characteristic information reflecting the motion of the head. An EEG detection signal configured to determine a motion of the head has a higher amplitude value and a distinct waveform characteristic, etc. Therefore, a recognition accuracy of a motion of the head is higher if in the solution, the EEG detection signal is used for recognition of a motion of the head of the human body.

Further optionally, the method for determining control information may further comprise: acquiring control information corresponding to the determined motion of the head. For example, a mapping relation between a motion of the head and control information may be acquired in advance, and the control information corresponding to the determined motion of the head may be acquired according to the mapping relation. Based on this solution it is possible to implement a natural, flexible and convenient human-computer interaction based on a motion of the head of the human body, satisfy a user's diversified demands for practical application, and improve the user experience.

Persons skilled in the art may understand that in any method according to a concrete implementation manner of the application, a sequence number of each step does not mean an execution sequence, and the execution sequence of each step shall be determined by its function and an internal logic, and shall not impose a limit on the implementation process of the concrete implementation manner of the application.

Figure 3:
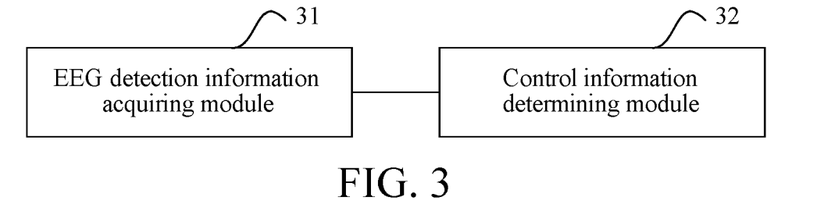
FIG. 3 is a logic block diagram of an apparatus for determining control information according to an embodiment of the application.

FIG. 3 is a logic block diagram of an apparatus for determining control information according to an embodiment of the application. As shown in FIG. 3, the apparatus for determining control information according to this embodiment of the application comprises: an EEG detection information acquiring module 31 and a control information determining module 32.

The EEG detection information acquiring module 31 is configured to acquire EEG detection information of a human body in response to a motion of a head of the human body.

The control information determining module 32 is configured to determine control information corresponding to the EEG detection information.

A device representation form of the apparatus for determining control information according to this embodiment of the application is quite flexible, for example, the apparatus for determining control information may be a certain independent unit, or the apparatus for determining control information may also be integrated, as a certain functional module, into a certain electronic device, wherein the electronic device may comprise but is not limited to a wearable device, etc.

The apparatus for determining control information may acquire EEG detection information of a human body in response to a motion of the head of the human body. Control information is determined by using the EEG detection information, which is equivalent to indirectly establishing, by means of detection of EEG information, an association between the motion of the head and the control information, thereby facilitating implementing, by taking the motion of the head as a locus of control, a more natural, flexible and convenient human-computer interaction, satisfying a user's diversified demands for practical application, and improving the user experience.

Figure 4:
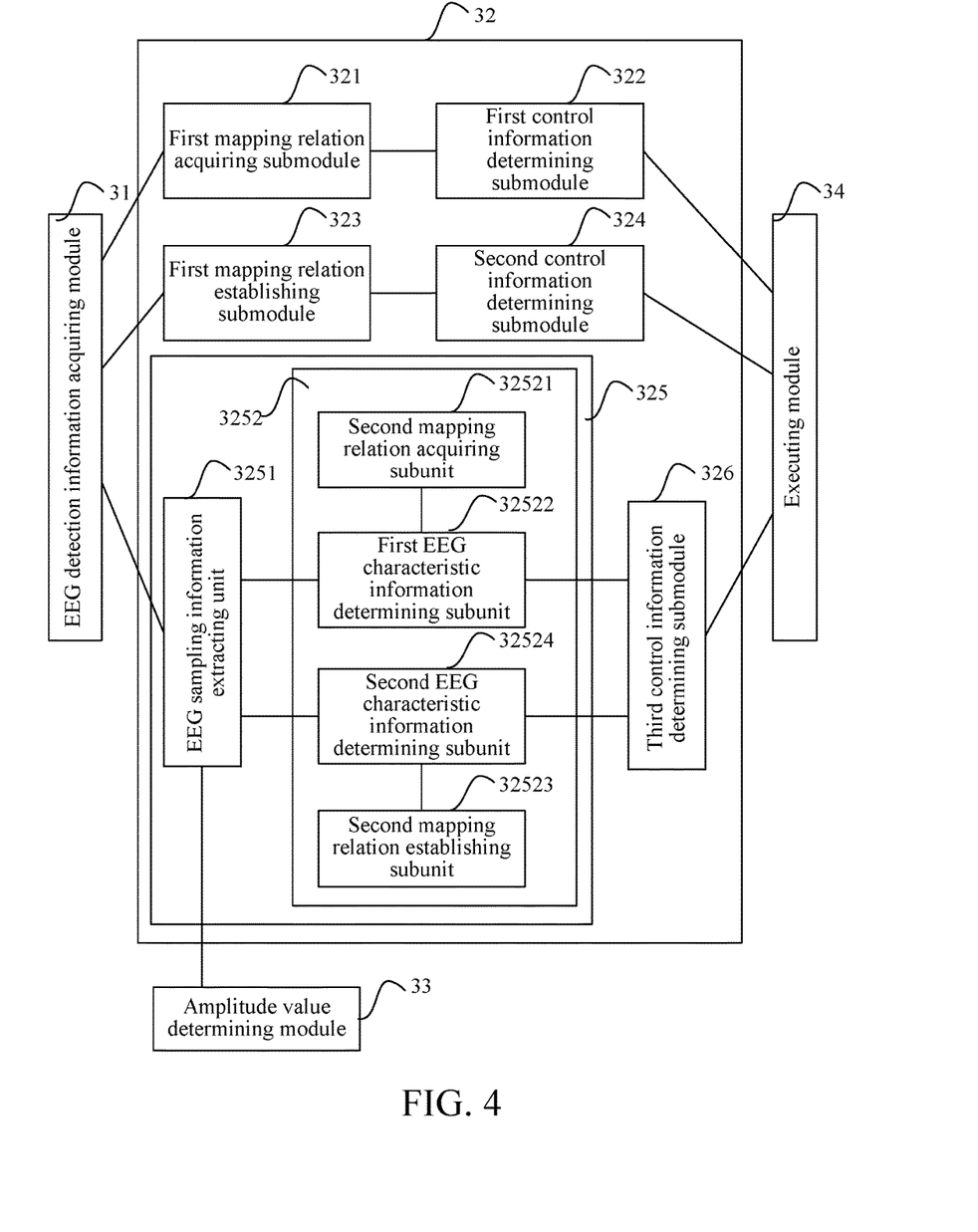
FIG. 4 is a logic block diagram of another apparatus for determining control information according to an embodiment of the application.

Optionally, as shown in FIG. 4, the control information determining module 32 comprises: a first mapping relation acquiring submodule 321 and a first control information determining submodule 322. The first mapping relation acquiring submodule 321 is configured to acquire, from an external device, a first mapping relation between EEG detection information and control information; and the first control information determining submodule 322 is configured to determine, according to the first mapping relation, the control information corresponding to the EEG detection information. By using this solution, it is possible to acquire, from an external device, the first mapping relation, thereby broadening a channel for acquiring the first mapping relation.

Optionally, the control information determining module 32 comprises: a first mapping relation establishing submodule 323 and a second control information determining submodule 324. The first mapping relation establishing submodule 323 is configured to establish a first mapping relation between EEG detection information and control information; and the second control information determining submodule 324 is configured to determine, according to the first mapping relation, the control information corresponding to the EEG detection information. By using this solution it is possible to obtain EEG information corresponding to different motions of the head according to training data of the motions of the head, and use the EEG information as a sample to establish an association between the EEG information serving as the sample and a control instruction. EEG information of different human bodies may have differences. By using this solution, learning and training may be conducted respectively on different human bodies. A sample database of EEG information of head motions of different human bodies is acquired, and an association between the sample database of EEG information and user information corresponding to the human bodies is established, so as to apply different matching data sources to different human bodies, thereby improving accuracy in determining control information.

Optionally, the control information determining module 32 comprises: an EEG characteristic information determining submodule 325 and a third control information determining submodule 326. The EEG characteristic information determining submodule 325 is configured to determine EEG characteristic information, of the EEG detection information, relative to EEG reference information of the human body; and the third control information determining submodule 326 is configured to determine the control information corresponding to the EEG characteristic information. In this solution, the whole EEG detection information is not used as a basis for determining control information, instead, a part of information of "interference or noise", relative to normal EEG information of the human body, in the whole EEG detection information is used as EEG characteristic information associated with the motion of the head, and the EEG characteristic information is used as a basis for determining control information, thereby reducing amount of data needing to be processed, reducing complexity in data processing, and improving efficiency and accuracy in determining control information.

Optionally, the EEG reference information is EEG information of the human body acquired when the head of the human body is in a motionless state. The EEG information of the human body acquired when the head of the human body is in a motionless state is used as the EEG reference information, so as to facilitate extracting EEG characteristic information corresponding to a motion of the head.

Optionally, the EEG characteristic information determining submodule 325 comprises: an EEG sampling information extracting unit 3251 and an EEG characteristic information determining unit 3252. The EEG sampling information extracting unit 3251 is configured to extract information in a certain frequency band from the EEG detection information as EEG sampling information; and the EEG characteristic information determining unit 3252 is configured to determine the EEG characteristic information according to an amplitude value of the EEG sampling information and a reference amplitude value of the EEG reference information in the frequency band.

Optionally, the apparatus for determining control information further comprises: an amplitude value determining module 33. The amplitude value determining module 33 is configured to determine that an amplitude value of the EEG detection information in the frequency band is greater than a predefined threshold and enable the EEG sampling information extracting unit according to a determined result. This solution may reduce interference to a certain extent by using the predefined threshold of the amplitude value of the EEG detection information in a certain frequency band as a screening condition.

Optionally, the frequency band is 0-5 HZ. The solution in which EEG detection information in this frequency band is used to determine control information corresponding to the EEG detection information is convenient for detecting EEG information, lower in complexity in data processing, higher in recognition accuracy and robust, etc.

Optionally, the EEG characteristic information determining unit 3252 comprises: a second mapping relation acquiring subunit 32521 and a first EEG characteristic information determining subunit 32522. The second mapping relation acquiring submodule 32521 is configured to acquire, from an external device, a second mapping relation between EEG characteristic information and control information; and the first EEG characteristic information determining subunit 32522 is configured to determine, according to the second mapping relation, the control information corresponding to the EEG characteristic information. The predefined threshold may be determined according to a characteristic of EEG information caused by a motion of the head. This solution may reduce interference to a certain extent by using the predefined threshold of the amplitude value of the EEG detection information in a certain frequency band (for example, 0-5 Hz) as a screening condition.

Optionally, the EEG characteristic information determining unit 3252 comprises: a second mapping relation establishing subunit 32523 and a second EEG characteristic information determining subunit 32524. The second mapping relation establishing submodule 32523 is configured to establish a second mapping relation between EEG characteristic information and control information; and the second EEG characteristic information determining subunit 32524 is configured to determine, according to the second mapping relation, the control information corresponding to the EEG characteristic information. In this solution, control information may be determined according to a part of information (i.e., EEG characteristic information), corresponding to a motion of the head, in the EEG detection information, thereby reducing amount of data needing to be processed, reducing complexity in data processing, and improving efficiency and accuracy in determining control information.

Optionally, the motion of the head comprises: nodding, leaning the head to one side, raising the head, shaking the head and/or rotating the head. The motion of the head may be spontaneously conducted by the human body subconsciously, or be conducted by the human body independently in certain ways, which may comprise but is not limited to duration of time or number of repetition of a combination of a certain motion or some motions.

Optionally, the apparatus for determining control information further comprises: an executing module 34. The executing module 34 is configured to execute an operation corresponding to the determined control information. Based on this solution it is possible to implement a natural, flexible and convenient human-computer interaction based on a motion of the head of the human body, satisfy a user's diversified demands for practical application, and improve the user experience.

Figure 5:
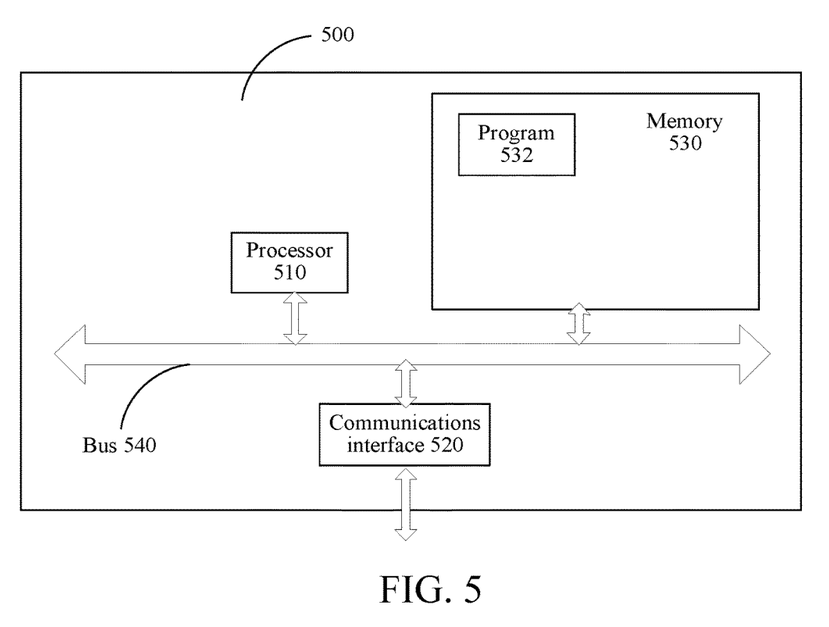
FIG. 5 is a logic block diagram of still another apparatus for determining control information according to an embodiment of the application.

FIG. 5 is a schematic structural diagram of another apparatus for determining control information according to an embodiment of the application. However, this concrete embodiment of the application does not limit an concrete implementation manner of the apparatus for determining control information 500. As shown in FIG. 5, the apparatus for determining control information 500 may comprise:

a processor (Processor) 510, a communications interface (Communications Interface) 520, a memory (Memory) 530 and a communications bus 540, wherein:

communications among the processor 510, the communications interface 520 and the memory 530 are achieved by means of the communications bus 540.

The communications interface 520 is configured to conduct communications among, for example, a first communications tool, a second communications tool or the like.

The processor 510 is configured to execute a program 532, particularly to execute related steps in any one of the foregoing communications control method embodiments.

For example, the program 532 may comprise a program code, and the program code comprises computer operating instructions.

The processor 510 may be a central processing unit (Central Processing Unit, hereinafter referred to as CPU), or an application specific integrated circuit (Application Specific Integrated Circuit, hereinafter referred to as ASIC), or one or more integrated circuits configured to implement the embodiments of the application.

The memory 530 is configured to store the program 532. The memory 530 may comprise a random access memory (Random Access Memory, hereinafter referred to as RAM), or further comprise a non-volatile memory (Non-volatile memory), for example, at least one magnetic disk memory.

For example, in an optional implementation manner, the processor 510 may execute, by executing the program 532, the following steps: acquiring EEG detection information of a human body in response to a motion of the head of the human body; and determining control information corresponding to the EEG detection information. In other optional implementation manners, the processor 510 may also execute, by executing the program 532, a step mentioned in any one of other embodiments above, which is not repeated herein.

Concrete implementation of various steps in the program 532 may refer to corresponding description of corresponding steps, modules, submodules and units in the foregoing embodiments, which is not repeated herein. Persons skilled in the art may clearly understand that for a convenient and concise description, a concrete work process of devices and modules described above may refer to a corresponding process description of the foregoing method embodiments, which is not repeated herein.

In the foregoing embodiments of the application, a sequence number and/or a sequencing of the embodiments are merely for the convenience of description, and do not represent advantages and disadvantages of the embodiments. Description of various embodiments may be focused on different parts, and a part not described in detail in a certain embodiment may be described in related description of other embodiments.

Persons of ordinary skill in the art may realize that it is possible to implement, by electronic hardware or a combination of computer software and electronic hardware, steps of units and methods in various examples as described in embodiments disclosed herein. Whether these functions are executed in a hardware mode or a software mode depends on specific applications and design constraints on the technical solutions. Technical professionals may use different methods to implement certain functions as described in specific applications. However, the implementation shall be not believed beyond the scope of the application.

The functions may be stored in a non-transitory computer-readable storage medium if they are implemented in the form of software function units and are sold or used as independent products. On the basis of such an understanding, the technical solution of the application in essence or that part of contribution to the prior art or a part of the technical solution may be embodied in the form of software products, which may be stored in a storage medium, comprising some instructions to cause a computer device (a personal computer, a server, a network device or the like) to execute all or a part of steps of the method as recited in the embodiments of the application. The forgoing storage medium comprises: a USB flash disk, a mobile hard disk, a read-only memory (Read-Only Memory, hereinafter referred to as ROM), a random access memory (Random Access Memory, hereinafter referred to as RAM), a magnetic disk or an optical disk and other media capable of storing a program code.

In the embodiments of the apparatus, the method and the system of the application, apparently, various parts (systems, subsystems, modules, submodules, units, subunits or the like) or steps may be disassembled, assembled and/or reassembled after being disassembled.

These disassembly and/or reassembly shall be deemed as equivalent solutions of the application. In the above description of the embodiments of the application, a characteristic as described and/or shown for an implementation manner may be used in one or more other implementation manners in the same or a similar manner, and may be combined with characteristics of other implementation manners or substitute characteristics of other implementation manners.

It should be emphasized that terms "comprise/comprising" used herein refer to existence of a characteristic, an element, a step or a module, but it shall not be exclusive of existence or addition of one or more other characteristics, elements, steps or modules.

Finally, it should be noted that: the foregoing implementation manners are merely intended for describing the application, and are not to limit the application. Persons of ordinary skill in the art may make various variations and modifications without departing from the spirit and scope of the application. Therefore, all equivalent technical solutions also fall within the scope of the application. And the patent protection scope of the application shall be defined by the claims.

What is claimed is:

1. A method for determining control information, comprising:
    acquiring EEG detection information of a human body in response to a motion of a head of the human body; and
    determining control information corresponding to the EEG detection information,
        wherein the determining control information corresponding to the EEG detection information comprises:
        determining EEG characteristic information, of the EEG detection information, relative to EEG reference information of the human body; and
        determining the control information corresponding to the EEG characteristic information,
            wherein the determining EEG characteristic information comprises:
            extracting information in a certain frequency band from the EEG detection information as EEG sampling information; and
            determining the EEG characteristic information according to an amplitude value of the EEG sampling information and a reference amplitude value of the EEG reference information in the frequency band.

2. The method of claim 1, wherein the determining control information corresponding to the EEG detection information comprises:
    acquiring, from an external device, a first mapping relation between EEG detection information and control information; and
    determining, according to the first mapping relation, the control information corresponding to the EEG detection information.

3. The method of claim 1, wherein the determining control information corresponding to the EEG detection information comprises:
    establishing a first mapping relation between EEG detection information and control information; and
    determining, according to the first mapping relation, the control information corresponding to the EEG detection information.

4. The method of claim 1, wherein the EEG reference information is EEG information of the human body acquired when the head of the human body is in a motionless state.

5. The method of claim 1, wherein before the extracting information in a certain frequency band from the EEG detection information as EEG sampling information, the method further comprises:
    determining that an amplitude value of the EEG detection information in the frequency band is greater than a predefined threshold.

6. The method of claim 1, wherein, the frequency band is 0-5 HZ.

7. The method of claim 1, wherein the determining the control information corresponding to the EEG characteristic information comprises:
    acquiring, from an external device, a second mapping relation between EEG characteristic information and control information; and
    determining, according to the second mapping relation, the control information corresponding to the EEG characteristic information.

8. The method of claim 1, wherein the determining the control information corresponding to the EEG characteristic information comprises:
    establishing a second mapping relation between EEG characteristic information and control information; and
    determining, according to the second mapping relation, the control information corresponding to the EEG characteristic information.

9. The method of claim 1, wherein the motion of the head comprises: nodding, leaning the head to one side, raising the head, shaking the head and/or rotating the head.

10. The method of claim 1, further comprising: executing an operation corresponding to the determined control information.

11. A non-transitory computer readable medium, comprising at least one executable instruction, which, in response to execution, causes performance of a method for determining control information, comprising:
    acquiring EEG detection information of a human body in response to a motion of a head of the human body; and
    determining control information corresponding to the EEG detection information,
        wherein the determining control information corresponding to the EEG detection information comprises:
        determining EEG characteristic information, of the EEG detection information, relative to EEG reference information of the human body; and
        determining the control information corresponding to the EEG characteristic information,
            wherein the determining EEG characteristic information comprises:
            extracting information in a certain frequency band from the EEG detection information as EEG sampling information; and
            determining the EEG characteristic information according to an amplitude value of the EEG sampling information and a reference amplitude value of the EEG reference information in the frequency band.

12. An apparatus for determining control information comprising a processor and a memory, the memory storing computer executable instructions that, when executed by the processor, cause the apparatus to perform operations, comprising:

acquiring EEG detection information of a human body in response to a motion of a head of the human body; and determining control information corresponding to the EEG detection information, wherein the determining control information corresponding to the EEG detection information comprises:

determining EEG characteristic information, of the EEG detection information, relative to EEG reference information of the human body; and determining the control information corresponding to the EEG characteristic information, wherein the determining EEG characteristic information comprises:

extracting information in a certain frequency band from the EEG detection information as EEG sampling information; and determining the EEG characteristic information according to an amplitude value of the EEG sampling information and a reference amplitude value of the EEG reference information in the frequency band.

13. The apparatus for determining control information of claim 12, wherein the operations further comprise:

acquiring, from an external device, a first mapping relation between EEG detection information and control information; and determining, according to the first mapping relation, the control information corresponding to the EEG detection information.

14. The apparatus for determining control information of claim 12, wherein the operations further comprise:

establishing a first mapping relation between EEG detection information and control information; and determining, according to the first mapping relation, the control information corresponding to the EEG detection information.

15. The apparatus for determining control information of claim 12, wherein the EEG reference information is EEG information of the human body acquired when the head of the human body is in a motionless state.

16. The apparatus for determining control information of claim 12, wherein the operations further comprise:

determining that an amplitude value of the EEG detection information in the frequency band is greater than a predefined threshold.

17. The apparatus for determining control information of claim 12, wherein the frequency band is 0-5 HZ.

18. The apparatus for determining control information of claim 12, wherein the operations further comprise:

acquiring, from an external device, a second mapping relation between EEG characteristic information and control information; and determining, according to the second mapping relation, the control information corresponding to the EEG characteristic information.

19. The apparatus for determining control information of claim 12, wherein the operations further comprise:

establishing a second mapping relation between EEG characteristic information and control information; and determining, according to the second mapping relation, the control information corresponding to the EEG characteristic information.

20. The apparatus for determining control information of claim 12, wherein the motion of the head comprises: nodding, leaning the head to one side, raising the head, shaking the head and/or rotating the head.

21. The apparatus for determining control information of claim 12, wherein the operations further comprise:

executing an operation corresponding to the determined control information.

\* \* \* \* \*